US006499905B2

(12) United States Patent
Boer

(10) Patent No.: US 6,499,905 B2
(45) **Date of Patent: *Dec. 31, 2002**

(54) APPARATUS FOR POP-UP DISPLAY STRUCTURES

(76) Inventor: Edmond J. Boer, P.O. Box 292, Flesherton, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/826,780

(22) Filed: Apr. 5, 2001

(65) Prior Publication Data

US 2001/0014249 A1 Aug. 16, 2001

Related U.S. Application Data

(63) Continuation of application No. 09/288,274, filed on Apr. 8, 1999, now Pat. No. 6,227,753.

(60) Provisional application No. 60/099,249, filed on Sep. 4, 1998.

(51) Int. Cl.[7] ................................................ F16C 11/00

(52) U.S. Cl. ......................... 403/61; 403/100; 403/102

(58) Field of Search ................................ 403/102, 100, 403/59, 61, 62, 63, 80, 146, 166; 135/74

(56) References Cited

U.S. PATENT DOCUMENTS

| | | | | | |
|---|---|---|---|---|---|
| 469,592 | A | * | 2/1892 | Parkes | 403/100 |
| 595,134 | A | * | 12/1897 | Bastide | 135/74 |
| 663,857 | A | * | 12/1900 | Browder | 403/100 |
| 963,737 | A | * | 7/1910 | Altpeter | 403/62 X |
| 1,541,674 | A | * | 6/1925 | Wever | 403/102 X |
| 2,490,889 | A | * | 12/1949 | Stallard | 403/102 X |
| 4,365,908 | A | * | 12/1982 | Thiboutot | 403/102 |
| 4,611,945 | A | * | 9/1986 | Diego | 403/102 X |
| 4,753,259 | A | * | 6/1988 | Hansen et al. | 403/100 X |
| 5,178,583 | A | * | 1/1993 | Rankin | 403/100 X |
| 6,227,753 | B1 | * | 5/2001 | Boer | 403/217 |

* cited by examiner

*Primary Examiner*—Lynne E. Browne
*Assistant Examiner*—David E. Bochna
(74) *Attorney, Agent, or Firm*—Hodgson Russ LLP

(57) ABSTRACT

An apparatus for a pop-up display structure that provides a hub structure that is divided into two sections that are held together by a thumbscrew. The two sections define internal channels in the hub for capturing guide pins attached to the tubes such that the tubes pivot about the guide pins and rotate about the hub through slots in the hub. The thumbscrew provides for removal of tubes from the hub structure without the use of tools and therefore provides for changes on the fly for reconfiguring the structure or for replacing broken tubes. The thumbscrew also provides a mounting structure for the channel bar that attaches to the pop-up structure. The channel bar is capable of folding into three sections and is capable of folding compactly without regard to the sequence of the folds.

2 Claims, 4 Drawing Sheets

APPARATUS FOR POP-UP DISPLAY STRUCTURES

CROSS-REFERENCE TO RELATED APPLICATION

The present application is a continuation application of U.S. patent application Ser. No. 09/288,274 filed on Apr. 8, 1999, and entitled "Apparatus for Pop-Up Display Structures," now U.S. Pat. No. 6,227,753, which claims priority based on U.S. Provisional Application No. 60/099,249 filed Sep. 4, 1998.

FIELD OF INVENTION

The present invention relates to pop-up display structures, and more particularly to a hub mechanism and a hinge mechanism for a channel bar.

BACKGROUND OF THE INVENTION

Pop-up display structures are prevalent in the trade show industry and generally comprise lightweight tubular structures that are capable of being transported, set up, and repacked in a relatively short time frame. The display structures include skeletons that typically comprise a set of pivotally attached tubes that are held together by hubs and that are capable of folding compactly for storage and shipping in containers, such as plastic storage cases. When the structure is moving into its expanded state, the tubes are allowed to rotate and expand about the hubs. The individual tubes are pivotally attached to the hubs, such that they can rotate from the folded to the expanded position. Once the display structure is expanded into position, the tubes are typically locked into position so that the structure cannot collapse.

After the skeleton is in place, a set of channel bars are attached to cover each row of hubs. The channel bars give the final structure a smooth and seamless appearance. After the channel bars are all attached to cover the hubs, a set of display panels is attached to the frame by magnets or other fasteners, such as hook and loop fasteners and the like.

Most of the existing systems require the tube frames to be fastened to the hub by means of rivets, screws, or push pins. These systems require tools in order to disassemble the apparatus to replace tubes or to repair or reconfigure the structure.

The channel bars are typically hinged into multiple sections due to their length so that they can be folded for storage and transport. Existing systems use unhinged parts or bungee cords or a variation of a butt hinge.

What is needed is a hub and hinge mechanism for a pop-up display structure that is easy to use, easy to manufacture, and that can be adjusted in the field without tools.

SUMMARY OF THE INVENTION

The present invention meets the above-described need by providing a hub mechanism that divides into two sections by means of a thumb screw. The two sections have channels defined therein that form a seat for a set of guide pins attached to the end of the tubes. The guide pins are captured in the seat formed by the channels in the two sections, and the guide pins pivot about the point defined by the seat inside the hub. The hub has a slot next to the seat that allows the tubes to rotate about the hub between the collapsed and expanded positions for the display structure. By means of the thumbscrew the two sections of the hub can be divided. Once the sections are divided by a certain distance, the guide pins that are attached to the end of the tubes are capable of slipping out of the hub such that the tubes can be removed for reconfiguration of the structure or for repair. Accordingly, the tubes can be removed without requiring the use of any tools.

The thumbscrew also provides a seating structure for the channel bars. Once the display structure is locked in its deployed condition, the channel bars are attached to the outside of the frame. The channel bars attach by means of a slot that slidingly engages with the head of the thumbwheel. The channel bars of the present invention are divided into three sections so that they can be folded compactly for storage and transportation. The sections are hingedly attached to one another such that they can be folded up without regard to the sequence of the folds. A sliding cam link connects adjacent sections of the channel bar. Each end of the link is pivotally attached to the contiguous sections. One end of the link is attached to and pivots about a pin that is spring biased and that travels in a slot. If another section has previously been folded over the midsection, the link is capable of moving forward against the force of the spring to increase the pivoting radius of the link and therefore to increase the clearance for folding the contiguous section over a previously folded section. If there is not a previously folded section, the cam link does not move along the slot as much and the contiguous section is capable of folding directly over the midsection and abutting the midsection along its entire length.

Accordingly, the present invention offers several advantages including providing for reconfiguration or replacement of tubes in a pop-up display structure without tools.

Another advantage is that the present invention provides for simplified mounting of the channel bars directly to the thumbwheel.

Also, the present invention provides for folding of the channel bars without regard to sequence.

DETAILED DESCRIPTION OF THE PREFERRED EMBODIMENT

Figure 1:
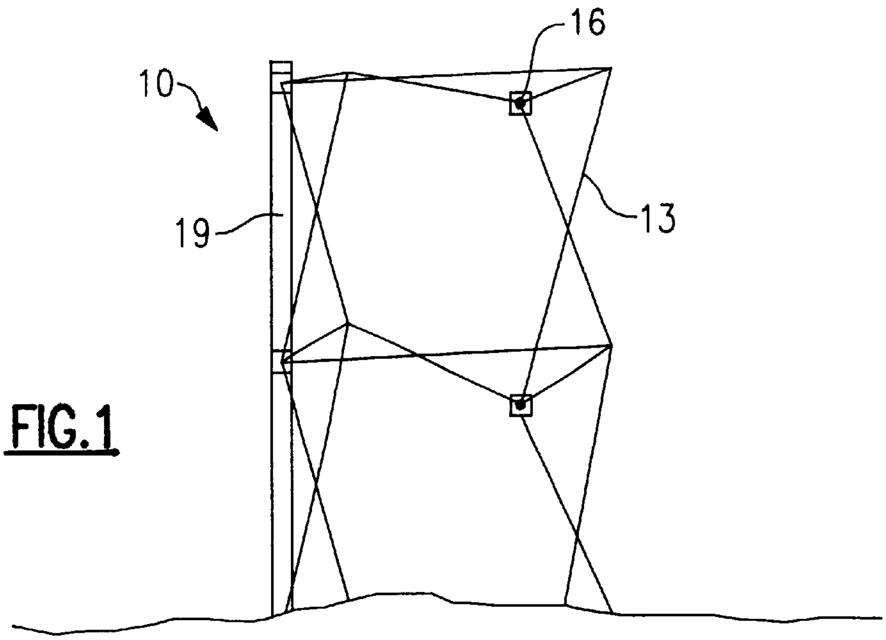
FIG. 1 is a partial perspective view of a pop-up display structure having the hub and channel bar of the present invention.

Referring to FIGS. 1–9 and initially to FIG. 1, a pop-up display structure 10 is constructed of a set of folding tubes

13 that are joined together and that pivot about a set of hubs 16. In FIG. 1, the display structure 10 is shown in the expanded state with a channel bar 19 attached from the top to the bottom of the structure to provide a covering for the hubs 16. The channel bar 19 provides a more aesthetically pleasing and seamless look to the display structure 10.

Figure 2:
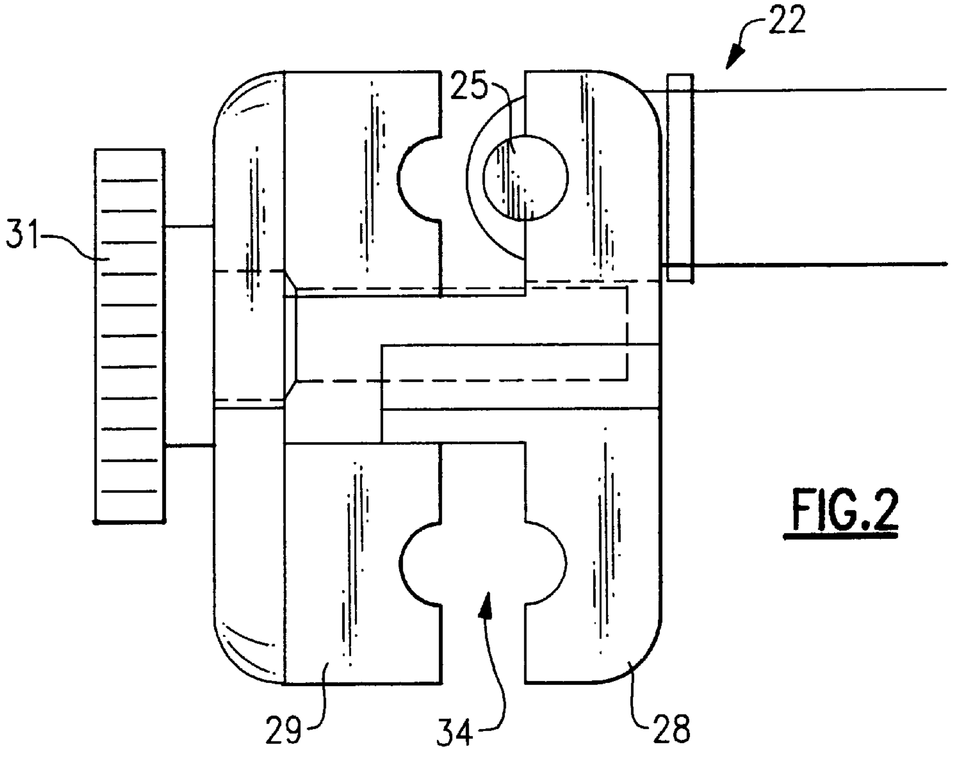
FIG. 2 is a side elevation view of the hub of the present invention.
Figure 5:
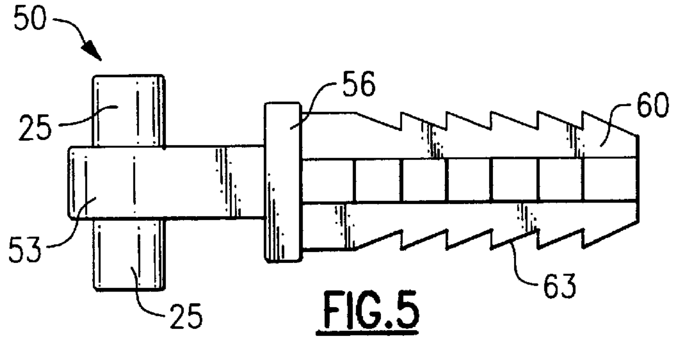
FIG. 5 is a top plan view of the molded pivot pin of the present invention.
Figure 6:
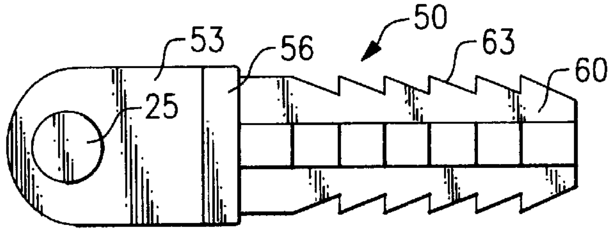
FIG. 6 is a side elevation view of the molded pivot pin of the present invention.

Turning to FIG. 2, the ends 22 of the tubes 13 are equipped with a set of guide pins 25 (best shown in FIGS. 5 and 6). The hub 16 is divided into a first section 28 and a second section 29. The sections 28 and 29 attach by means of a thumbscrew 31. The sections 28 and 29 cooperate to capture the pins 25 and to provide a set of channels 34 inside the hub 16 that provide for support of the pins 25 and enable the tubes 13 to rotate about the hub 16. By loosening the thumbscrew 31, the end of the tube 13 can easily be lifted completely out of the channel 34. In this manner, the display structure 10 can be reconfigured in the field without tools or a damaged tube 13 can be removed and replaced on site and without tools.

Figure 3A:
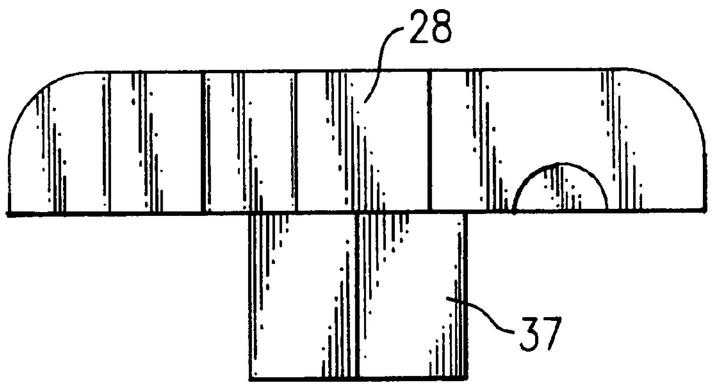
FIG. 3A is a top plan view of the front half of the hub of the present invention.
Figure 4A:
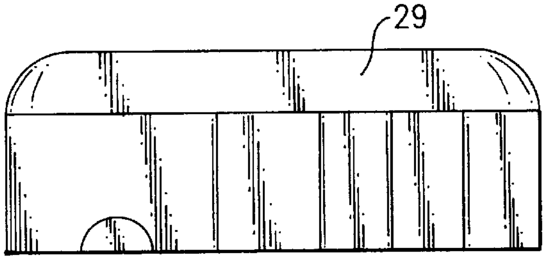
FIG. 4A is a top plan view of the back half of the hub of the present invention.
Figure 4B:
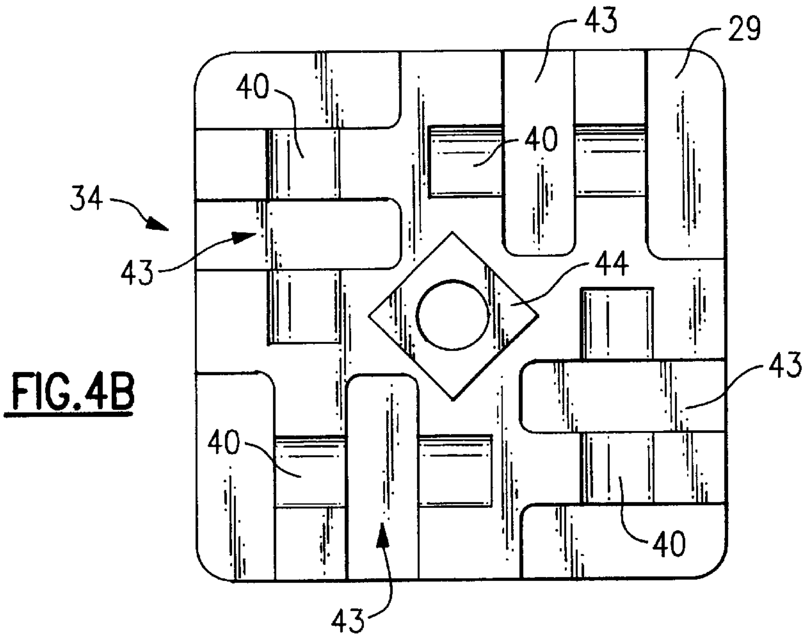
FIG. 4B is a front elevational view of the back half of the hub of the present invention.

Turning to FIG. 3A, the first section 28 has a projection 37 that engages and aligns with an opening in the second section 29 (best shown in FIG. 4B). The projection 37 is preferably square, however, any other shape would also be suitable so long as the shape on section 28 is sized and shaped to be able to engage with a cooperating member on section 29 such that the two sections 28 and 29 are aligned properly to form the channels 34 for holding the guide pins 25.

Figure 3B:
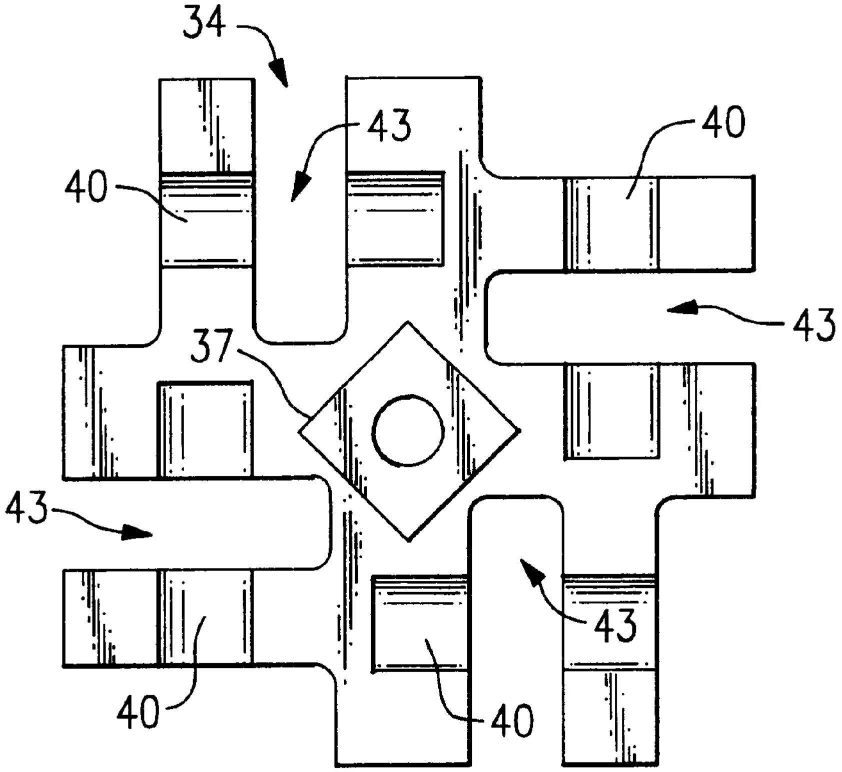
FIG. 3B is a front elevational view of the front half of the hub of the present invention.

Turning to FIG. 3B, the channels 34 are shown as they are oriented inside the hub 16. The channels include a seat portion 40 and an open slot 43. The seat portion 40 holds the guide pins 25 in position, and the slot 43 provides a pathway for the tubes 13 to rotate about the hub 16 between a retracted position and an expanded position. The projection 37 is located in the middle of the section 28 and provides for aligning the two sections 28 and 29 as described above.

Turning to FIGS. 4A and 4B, the cooperating section 29 is shown having channels 34 and a structure 44 for receiving projection 37 for aligning the two sections. The channels 34 on section 29 align with the channels on section 28 such that the guide pins 25 are captured in the seat 40 formed by and between the two sections 28 and 29. The pins 25 are preferably captured in the seat 40 and prevented from movement other than rotation. With the guide pins 25 attached to the ends of the tubes 13, the tubes 13 rotate about the pivot point established by the guide pins 25. The tubes 13 are free to rotate inside the slots 43 formed between sections 28 and 29.

In order to place a tube 13 into a hub 16, the thumbscrew 31 is loosened until there is enough room to slide the pins 25 through the opening in the hub 16 created by the separation of the two sections 28 and 29 (best shown in FIG. 2).

Turning to FIGS. 5 and 6, the guide pins 25 are preferably formed as part of an end cap 50. The end cap 50 has a longitudinal member 53 that supports the guide pins. The longitudinal member 53 extends from a cap section 56 that covers the end of the tube 13. Extending from the cap section 56 into the tube 13 is a tube gripping section 60 having serrated edges 63. The tube gripping section 60 is designed to frictionally engage with the inside of the tube 13 to hold the end cap 50 onto the end of the tube 13.

Figures 7, 8, 9:
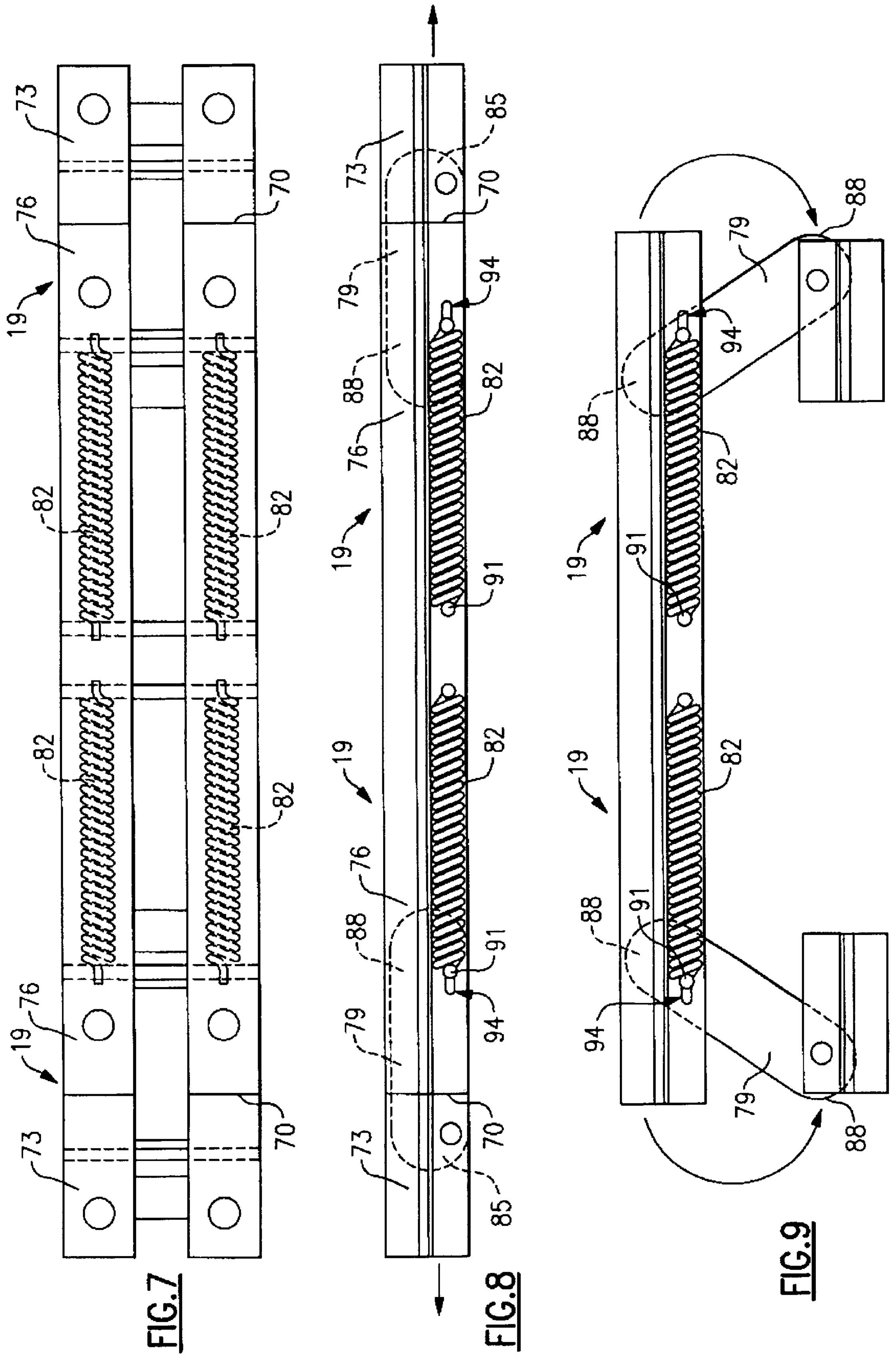
FIG. 7 is a partial bottom plan view of the channel bar of the present invention.
FIG. 8 is a partial elevational side view of the hinge mechanism for the channel bar of the present invention.
FIG. 9 is a partial elevational side view of the hinge mechanism for the channel bar as it is folded to accommodate three segments of the channel bar.

In FIGS. 7–9, the channel bar 19 has a hinge 70 where contiguous sections 73 and 76 of the channel bar 19 are attached. The contiguous sections 73 and 76 are held together by means of a cam link 79 and a set of springs 82. A first end 85 of the cam link 79 is pivotally attached to the section 73. A second end 88 of the cam link 79 is pivotally attached to a pin 91 that travels in a slot 94. The springs 82 attach to the pin 91.

A third section of the channel bar (not shown) attaches to the middle section 76 in the same manner. The configuration of the sliding cam pivot provides for folding the three sections over each other without regard to sequence.

Turning to FIG. 9, if the other section of the channel bar 19 has previously been folded over the middle section 76, the sliding cam link enables the section 73 to fold over the previously folded section by means of the cam link 79 sliding along the slot 94 to provide clearance for folding. On the other hand if the first fold is to be section 73 back over section 76, the cam link 79 does not have to slide as much because the clearance for the other section is not required.

The operation of the apparatus will be evident to those of ordinary skill in the art from the above description.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A channel bar, comprising:

a first pivoting member;

a second pivoting member disposed opposite from the first pivoting member;

an intermediate section disposed between the first and second pivoting members;

a first cam link pivotally and directly attached to the first pivoting member at one end and pivotally attached at the opposite end to a spring mounted on the intermediate section so as to provide a moveable pivot point for the first cam link;

a second cam link pivotally and directly attached to the second pivoting member at one end and pivotally attached at the opposite end to a spring mounted on the intermediate section so as to provide a moveable pivot point for the second cam link;

whereby the first pivoting member and the second pivoting member are capable of being folded over the intermediate section such that one of the pivoting members overlies the intermediate section and the pivoting members overlie each other regardless of the order in which the pivoting members are folded.

2. A channel bar for use with a pop-up display structure having a plurality of hubs, the channel bar comprising:

a first pivoting member;

a second pivoting member disposed opposite from the first pivoting member;

an intermediate section disposed between the first and second pivoting members;

a first cam link pivotally and directly attached to the first pivoting member at one end and pivotally attached at the opposite end to a spring mounted on the intermediate section so as to provide a moveable pivot point for the first cam link;

a second cam link pivotally and directly attached to the second pivoting member at one end and pivotally attached at the opposite end to a spring mounted on the intermediate section so as to provide a moveable pivot point for the second cam link; whereby the first pivoting member and the second pivoting member are capable of being folded over the intermediate section such that one of the pivoting members overlies the intermediate section and and the pivoting members overlie each other regardless of the order in which the pivoting members are folded;

wherein the channel bar is adapted to cover at least one of the plurality of hubs.

* * * * *